(12) United States Patent
Murti et al.

(10) Patent No.: US 11,394,802 B2
(45) Date of Patent: Jul. 19, 2022

(54) DYNAMIC DISPLAY OF OPERATION TIMING AND SUCCESS RATE

(71) Applicant: EMC IP Holding Company LLC, Hopkinton, MA (US)

(72) Inventors: Arun Murti, Mission Viejo, CA (US); Adam Brenner, Mission Viejo, CA (US); Mark Malamut, Aliso Viejo, CA (US); Vijay Anand, Irvine, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 107 days.

(21) Appl. No.: 16/911,126

(22) Filed: Jun. 24, 2020

(65) Prior Publication Data
US 2021/0409511 A1 Dec. 30, 2021

(51) Int. Cl.
*G06F 15/16* (2006.01)
*H04L 67/62* (2022.01)
*H04L 67/125* (2022.01)
*H04L 67/133* (2022.01)
*H04L 67/01* (2022.01)

(52) U.S. Cl.
CPC .......... *H04L 67/325* (2013.01); *H04L 67/125* (2013.01); *H04L 67/40* (2013.01); *H04L 67/42* (2013.01)

(58) Field of Classification Search
CPC ..... H04L 67/325; H04L 67/125; H04L 67/40; H04L 67/42
USPC ......................................................... 709/203
See application file for complete search history.

(56) References Cited

U.S. PATENT DOCUMENTS

| | | | |
|---|---|---|---|
| 6,601,035 B1 * | 7/2003 | Panagos ............. | G06Q 10/0633 705/7.22 |
| 2006/0007944 A1 * | 1/2006 | Movassaghi ........ | H04L 41/0813 370/401 |
| 2014/0201747 A1 * | 7/2014 | Pattnaik ............. | G06F 11/3006 718/101 |

* cited by examiner

*Primary Examiner* — Atta Khan
(74) *Attorney, Agent, or Firm* — Staniford Tomita LLP

(57) ABSTRACT

A method and system of providing estimates or recommendations for software lifecycle management tasks by obtaining and storing local timing and result data for a current run of an application task on a local client, and gathering global timing and result data in a server computer for a plurality of clients including the local client. The local client combines its local timing and result data with the global timing and result data to generate an estimated time completion and success probability for a next run of the application task. The local client uses a rule definition file to substitute function variables for text strings and recommendation text with the appropriate values from the combined timing and result data and outputs the final time estimate UI string and recommendation through a user interface for display to a user.

20 Claims, 7 Drawing Sheets

| Workflow | Name | | Result | | | | | | Context | | | | | |
|---|---|---|---|---|---|---|---|---|---|---|---|---|---|---|
| | Operation | Quantum | Avg. | Min. | Max. | Std. Dev. | Success Rate | ... | SystemID | Version | Config | Size Storage | Size Assets | ... |
| SystemUpgrade | UpgradeDataSto re | DownloadPacka ge | 10 | 5 | 15 | 2 | 99% | ... | ABC123 | 1.1 | M2000 | 1000000000 00 | 5000 | ... |
| SystemUpgrade | UpgradeDataSto re | PreCheck | 5 | 3 | 8 | 1 | 99% | ... | ABC123 | 1.1 | M2000 | 1000000000 00 | 5000 | ... |
| | | | | | | | | | | | | | | |

```
┌─────────────────────────────────────────┐
│ Obtain Local Timing/Result Data for     │
│ Current Run of Task on QO Client        │
│ 702                                     │
└─────────────────────────────────────────┘
                    │
                    ▼
┌─────────────────────────────────────────┐
│ Store Local Timing/Result Data in       │
│ Client Database Table                   │
│ 704                                     │
└─────────────────────────────────────────┘
                    │
                    ▼
┌─────────────────────────────────────────┐
│ Send Local Timing/Result Data to QO     │
│ Server to Aggregate and Group to        │
│ Global Timing/Result Data               │
│ 706                                     │
└─────────────────────────────────────────┘
                    │
                    ▼
┌─────────────────────────────────────────┐
│ Receive Global Timing/Result Data       │
│ From QO Server                          │
│ 708                                     │
└─────────────────────────────────────────┘
                    │
                    ▼
┌─────────────────────────────────────────┐
│ Combine Local and Global Data to        │
│ Generate Time Estimate and              │
│ Recommendation for Next Run             │
│ 710                                     │
└─────────────────────────────────────────┘
                    │
                    ▼
┌─────────────────────────────────────────┐
│ Use Rule Definition File to Substitute  │
│ Function Variables with Combined        │
│ Timing/Result Data                      │
│ 712                                     │
└─────────────────────────────────────────┘
                    │
                    ▼
┌─────────────────────────────────────────┐
│ Output Time Estimate and                │
│ Recommendation for Next Run to User     │
│ through QO Client User Interface        │
│ 714                                     │
└─────────────────────────────────────────┘
```

FIG. 7

DYNAMIC DISPLAY OF OPERATION TIMING AND SUCCESS RATE

TECHNICAL FIELD

This invention relates computer applications including gathering and processing data to accurately estimate the time and likelihood of success to complete an application task.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Large-scale enterprises typically use a great number of disparate application programs to perform various tasks involving electronic data, such as data backup, disaster recovery, and content creation (e.g., database, word processors, spreadsheet, e-mail, etc.). Such applications usually require installation, maintenance (upgrades, bug fixes, patches, etc.), and other software lifecycle management operations to stay current and useful. Though such operations are usually run as routine background tasks, they can take some time to complete and often block or tie up system resources while doing so.

It is generally important for application operations to be both fast and deterministic. Knowing how long an operation will take and how likely it is to succeed is important for both large, distributed networks, as well as for smaller scale, time-sensitive applications and systems. Networked applications as well as non-real time applications are known for having varied and unpredictable completion times, as well as uneven success rates. Factors such as network use, system availability, equipment reliability, and so on, can all impact the performance of computer applications to the point of excessively lax tolerance. For example, in one run, a system upgrade or data backup operation may take on the order of a few minutes, but in another run the same operation may take closer to an hour to complete.

When performing a maintenance task or some similar time-sensitive operation, product user interfaces typically set users' expectations by providing time estimates for operations. For example, a UI may display a message such as: "the system upgrade will take up to 30 minutes to complete." This allows the user to know that the computer will be unavailable for that period of time, and he or she can do take a break or do other work, and so on. Such information is typically static and does not change based on context like system configuration, which can lead to user frustration when the estimates are out of date or otherwise inaccurate. They are also usually generated and updated through manual testing and analysis, then hard-coded into a particular product release, so keeping the estimates current over time requires high amounts of recurring effort from product development teams.

What is needed, therefore, is a method that fully automates the process of analyzing large volumes of past result data to provide users with accurate time estimates, success rates, and recommended optimizations for workflows and operations to improve on existing products that rely on manual steps. What is further needed is a system that uses dynamic information rather than static data, and that combines both internal testing data and real-world customer data.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4 illustrates a table that lists the data elements for stored local statistics in a quantum operations client, under some embodiments.

FIG. 7 is a flowchart that illustrates an overall method of providing estimates or recommendations for software lifecycle management tasks using a quantum operations process, under some embodiments.

DETAILED DESCRIPTION

Figure 1:
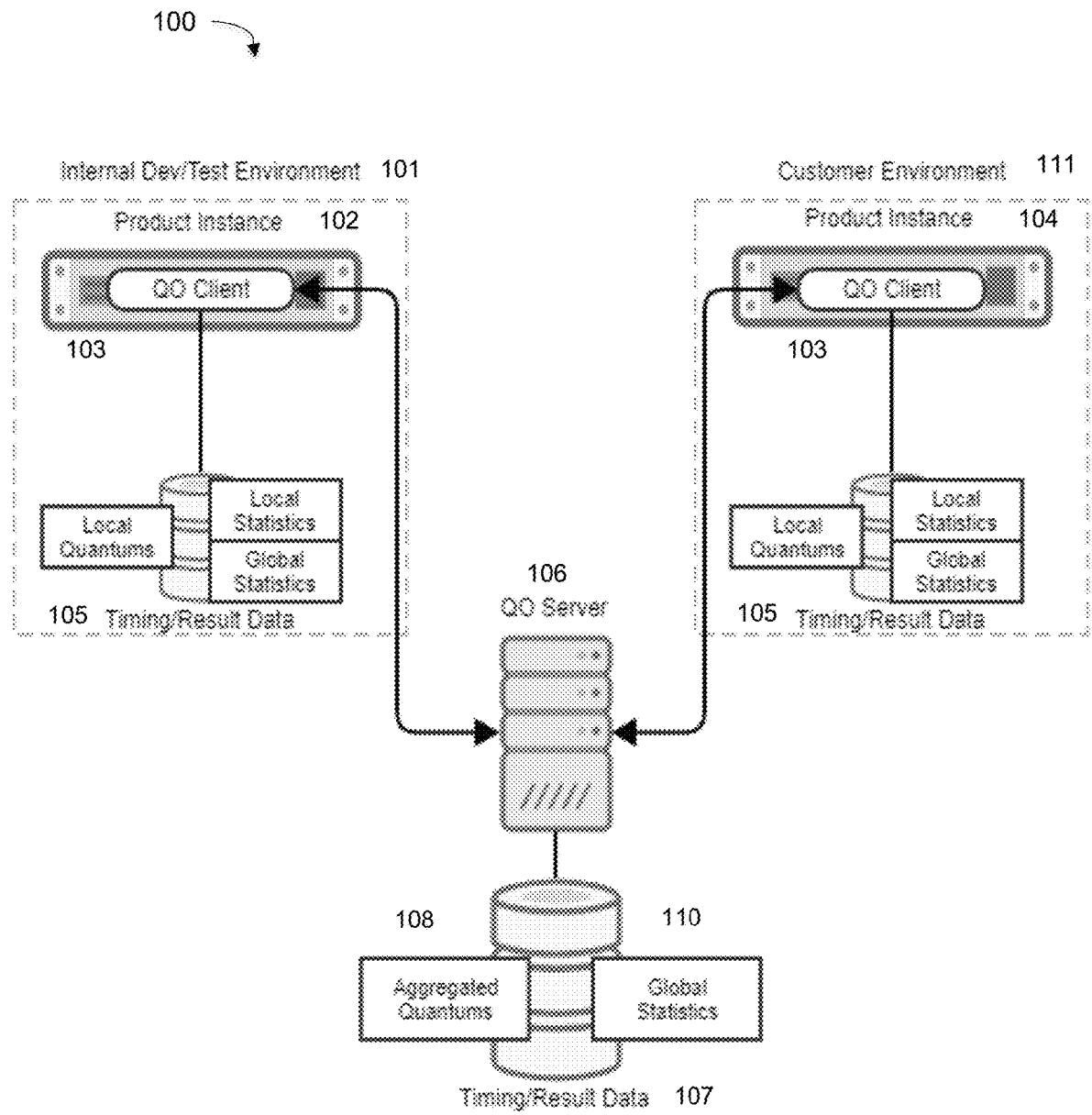
FIG. 1 is a diagram of a client-server computer network implementing a process of dynamically displaying operation timing and success rate, under some embodiments.

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the described embodiments.

Some embodiments of the invention involve data processing in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

As mentioned above, in current application and software maintenance products, the metrics for the time taken for operations and their success rate are usually measured during a limited set of internal performance testing runs, based upon which UI labels are manually written. Telemetry data from customer systems may be gathered once a product or feature is released, but analysis of that data is typically performed manually by a system administrator or other technician. Telemetry data from internal systems is generally ignored. Therefore, updates to the UI for all features in every new version is practically infeasible, and updates for individual features are rare given the opportunity cost compared to new features or bug fixes. Similarly, recommendations based on the potential to improve the performance of operations must be generated manually, on a case-by-case basis, by customer support teams or even customers themselves. In general, telemetry data refers to data that is collected from product instances at remote sites and transmitted back to a vendor or system administrator for analysis. It can thus represent historical operational data, and can be aggregated, filtered, or otherwise processed or analyzed.

Embodiments are described for a quantum operations or 'quantum ops' (QO) process that overcomes present issues by fully automating the process of analyzing large volumes of telemetry data to provide users with estimated times, success rates, and recommended optimizations for workflows and operations related to software product lifecycle management. Such a process improves upon existing products that rely on manual effort and documented best practices to do so. Furthermore, the information provided is dynamic rather than static and combines both internal testing data and real-world customer data rather than relying solely on one set of data or the other.

In general, product lifecycle management refers to tasks associated with software program installation, management, replacement, and so on. Other similar tasks may involve periodic data maintenance and routine administrative tasks, such as data backup, restoration, mirroring, and so on. Although embodiments are described with respect to such tasks, other measurable software operations may also be processed as described, such as normal application program execution and any other function that takes a certain amount of time to complete and/or that may not have an absolute guarantee of success.

FIG. 1 illustrates a computer network system that implements one or more embodiments of a networked computer system implementing a quantum ops process, under some embodiments. In such a system, a number of networked computers are operated by different users, all of whom execute application programs to perform certain tasks. In a vendor/customer type of network, a number of users or customers may operate their own respective computers or sub-networks in one or more customer environments 111. The vendor or system administrator may operate a server computer 106 to provide one or more applications, resources, or processes to the users, and it may also operate a user-based environment for internal development or testing in environment, such as test/dev environment 101. Although example embodiments are shown with two product instances 102 and 104 for customer environment 111 and test/dev environment 101, it should be noted that any practical number of product instances can be present in network 100.

The networked client-server computers may be coupled directly or indirectly to one another and to other application, data sources, and other resources through a network. The network may be a public cloud network (but may also be a private cloud, LAN, WAN or other similar network), and provides connectivity to the various systems, components, and resources of system 100, and may be implemented using protocols such as Transmission Control Protocol (TCP) and/or Internet Protocol (IP), well known in the relevant arts. In a cloud computing environment, system 100 represents a network in which applications, servers and data are maintained and provided through a centralized cloud computing platform.

As shown for system 100 of FIG. 1, an overall quantum ops solution consists of QO client processes or components 103 embedded in each product instance (102 or 104) plus a central QO server 106. Each client has its own respective timing/result database 105 that stores both its local and global statistics data and averages, that store data regarding their own execution of resident applications. This data is sent to the QO server 106, which has its own timing/result database 107 in which the aggregate and global data is stored.

The quantum ops process as implemented through server 106 and clients 103, provides a framework to automatically provide messages to users about operation estimates with the desired timing data and to update those messages dynamically. This improves the user experience by ensuring that timing information remains current and accurate over time, without having to wait for a version upgrade, and without requiring manual effort from product teams. In addition to the estimated time, it also provides a historical success rate, such as provided in a message: "the system upgrade will take up to 30 minutes to complete, with an average 98% success rate." This gives operators an indication of risk and allows them to know whether they need to actively monitor the operation.

The QO client 103 embedded in each product instance (102, 104) communicates the timing and result of operations to the central server 106. The server collects the information, calculates aggregate statistics 108, then sends the results back to the product instances (102, 104) for use in messages to the user. Furthermore, factors such as version number and system configuration are collected as additional context, which can then be used to provide straightforward recommendations to customers on how to reduce the time taken by operations or improve their success rate. For instance, "system maintenance time can be reduced from 2 hours to 1 hour by increasing version number from 2.8 to 3.0". Currently, such recommendations also rely on tedious manual analysis and reporting to individual clients.

Figure 2:
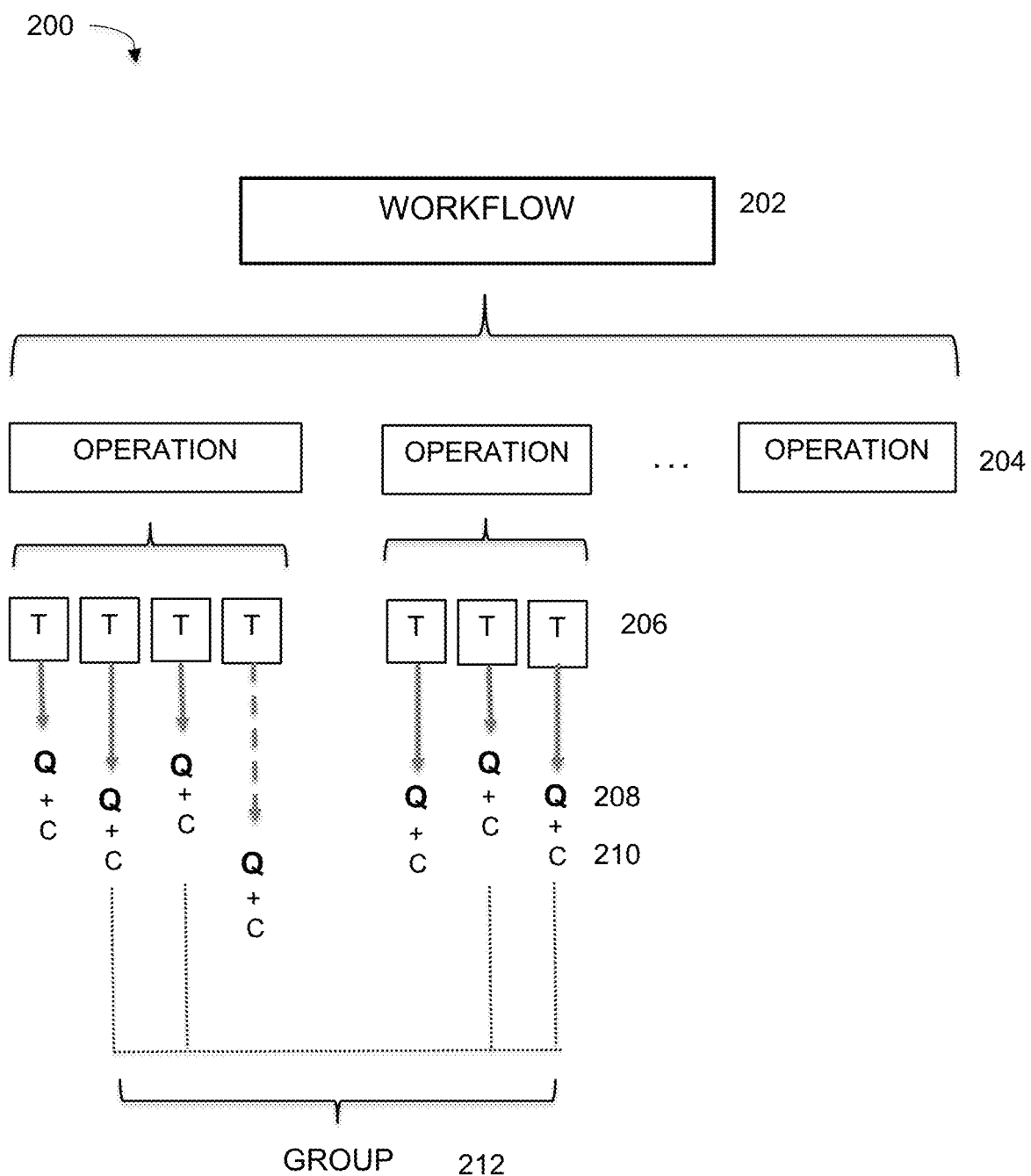
FIG. 2 illustrates an example hierarchy of different sets of operational units, under some embodiments.

In an embodiment, relevant timing and result (e.g., success/fail or success probability) data 105, 107 is obtained for various different types of software operations, such as application tasks, operating system functions, maintenance routines, system administration functions, background scripts, and so on. Such operations can be embodied as program routines, sub-routines, functions, and so on, in any executable program used in the system. For purposes of the present description, certain basic operational units are provided to describe levels of granularity with respect to program code execution. FIG. 2 illustrates an example hierarchy of different sets of operational units, under some embodiments. As shown in diagram 200, a 'task' (T) 206 is a unit of work performed by a software or hardware system. A task generally represents the smallest unit of work measured in the system 100. An 'operation' 204 is a sequence of one or more tasks, and a 'workflow' 202 is a sequence of one or more operations. The three hierarchical elements of workflow-operation-task represent the basic software program structures that are processed to determine how long and how successful a given operation would be executed based on past data. Timing and result data is generally obtained and processed at the task level of this hierarchy, but other levels can also be used, such as at the operation level.

A 'quantum' (Q) 208 is a recorded result and timing data associated with completion of a task. As shown in FIG. 2, completion of each task T produces a quantum with the length of the connecting arrow implying a time duration and the dashed-line arrow implying failure of the task.

A 'context' (C) 210 is additional data associated with each quantum, Q, that records key properties of the system and environment in which the task was run. As shown in FIG. 2, a quantum plus the associated context is denoted Q+C. The properties of each context should have a direct impact on the timing or success of the task (e.g., 'size' that makes the task run shorter or longer). A 'context grouping' 212 is a set of rules that specify how to group contexts together such that significant changes create a new grouping. For example: all contexts where the version number is the same are grouped together; however, contexts where the size is in a different log(base 10) bucket are grouped separately. For the example of FIG. 2, the last two successfully completed tasks for each operation are grouped together. This implies that the system context changed overall sometime during the execution of those operations, e.g., the overall workflow is an upgrade so the version number changes partway through, thus causing the latter tasks' contexts to be grouped based on the new version. This is just one example, and other groupings based on other circumstances are also possible.

With respect to certain programming implementations, the name of the task is a string with the following format: (Workflow Name).(Operation Name).(Task Name). Workflow Name and Operation Name are included when applicable. If a task runs independently, only its name is required. The result indicates whether the task succeeded or failed. The timing data includes the start timestamp (in UTC) and end timestamp (in UTC), from which elapsed time can be calculated. Through individual tasks 206, an operation 204 consists of one or more quantums 208.

With respect to example lifecycle management operations, an "UpgradeDataStore" operation may consist of the following quantums: DownloadPackage, VerifyPackage, RunPreCheck, RunUpgrade, RunPostCheck. One or more operations can be combined into a the overall workflow 202. This allows for more complex operations involving multiple components. For example, the "SystemUpgrade" workflow may consist of the following operations: UpgradeControlPlane, UpgradeDataStore, UpgradeInfrastructure. As above, a specific quantum is named using a string with the following format: (Workflow Name).(Operation Name).(Quantum Name). A subset of the string specifies the aggregate data for all entries at the respective level of workflow, operation, and quantum (i.e., task). For example, SystemUpgrade.UpgradeDataStore.Precheck refers to the timing and result of a specific quantum, while SystemUpgrade.UpgradeDatastore. refers to the aggregate timing and result of all quantums in the SystemUpgrade.UpgradeDataStore operation.

Referring back to FIG. 1, a 'quantum ops client' 103 is software running on a product instance that forms one part of a client/server-based system along with the QO server 106. An instance of the QO client is associated with a single instance of the QO server. A 'QO server' 106 is software running as a centralized instance that forms the other part of the client/server-based system along with the QO client. Many instances of the QO client are associated with a single instance of the QO server. 'Local quantums' are a log of the quantums recorded by the QO client 103 for the product instance (102 or 104) on which it is running. 'Local statistics' are a set of cumulative statistics for each task calculated by the QO client using its local quantums, representing the historical performance of the product instance. Statistics for each task include: average duration, minimum duration, maximum duration, and standard deviation of duration. The statistics are calculated for each task for each context grouping. 'Aggregated quantums' 108 are a log of all quantums recorded by all QO clients sent to and compiled by an instance of the QO server 106. 'Global statistics' 110 are a set of cumulative statistics for each task calculated by the QO server using the aggregated quantums 108, representing the historical performance of all product instances associated with the connected QO clients 103. One copy is stored by the QO server 106 and one copy by each QO client 103 associated with that QO server.

Figure 3:
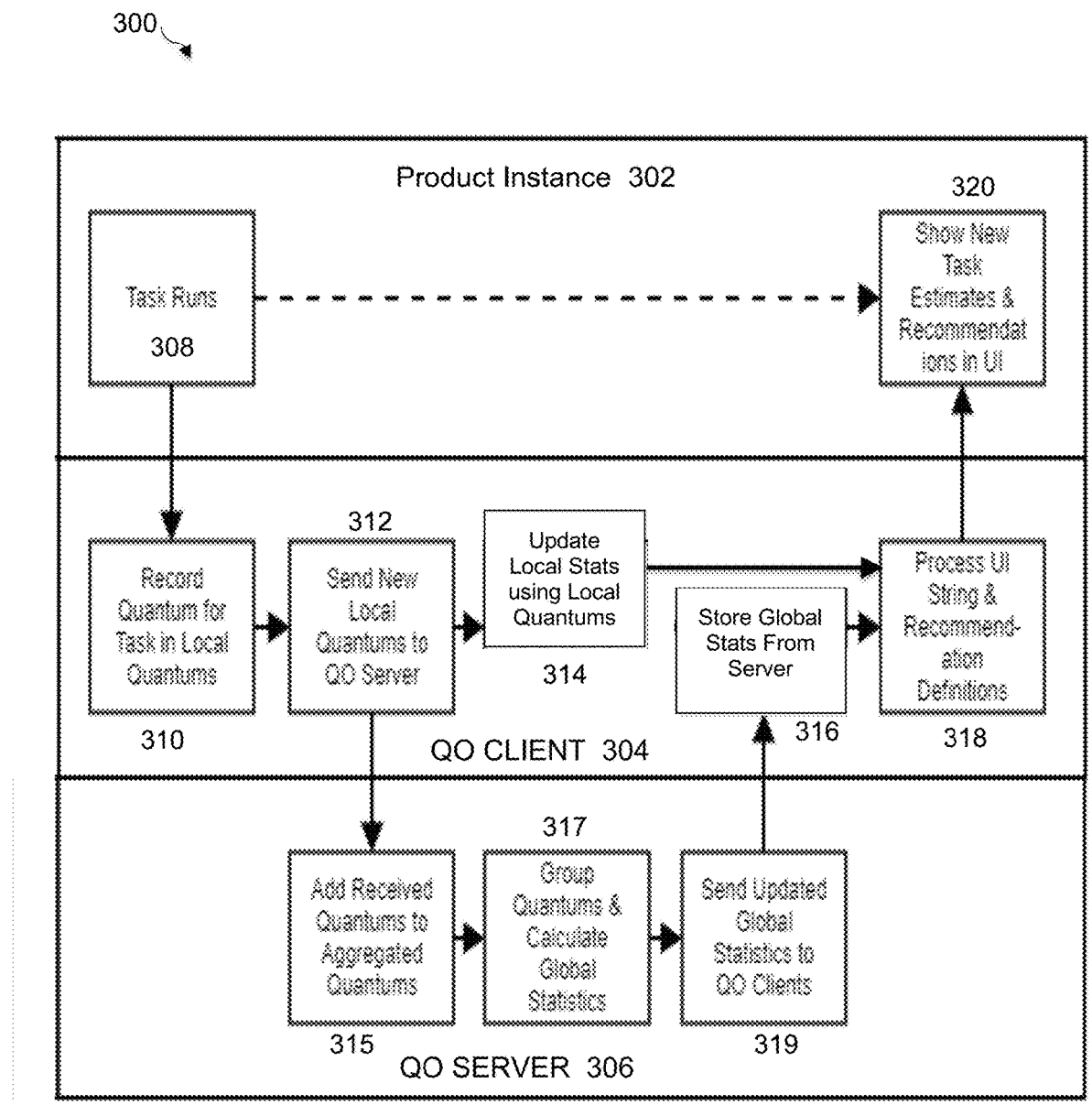
FIG. 3 is a diagram illustrating operation of a server and client executing a quantum operations process, under some embodiments.

FIG. 3 is a diagram illustrating operation of a QO server 306 and QO client 304 for a quantum ops process, under some embodiments. In diagram 300 of FIG. 3, a product instance 302 initiates task runs 308 as part of an operation and greater workflow. Each task creates a quantum that is processed by the QO client 304. When each quantum is run, the QO client 304 sends (in step 312) the full name, start timestamp (UTC), end timestamp (UTC), and the result (i.e., success or failure) to the QO server 304 and also stores a copy in its local database. Additionally, each quantum has an additional context attached. Examples of context fields include the version number, system configuration, and fields related to size (e.g., amount of storage, number of assets, or cache size), and other key properties that have a major effect on the outcome of operations. For simplicity, the fields included in the context are fixed for a given product, and all context is attached to every quantum (as shown as Q+C in FIG. 2). The context is useful because a system running a newer version with performance optimizations may be faster than a system running an older version, or a fully loaded system with lower system resources may be slower than a lightly loaded system with higher system resources.

In an embodiment, the QO server 306 is used to generate global statistics from all of the clients in the system. Thus, in step 312, QO client 304 sends its local quantums to the QO server to be combined with the local statistics of the other clients. In the QO server 306, a process adds the quantums received from QO client 304 to a set of aggregated quantums, 315. It then groups the quantums and calculates the global statistics 317 for sending back to the QO clients including QO client 304. Further detail regarding the QO server operations of FIG. 3 will be provided below.

With respect to the QO client 304 operations in FIG. 3, in step 314, the QO client updates its local statistics using local quantums. It also receives and stores in step 316, the global statistics sent from the QO server. These global statistics include its own local statistics combined with the local statistics of any other clients served by QO server 306. For each quantum, a set of aggregate time statistics is calculated, including (but not limited to): average duration, minimum duration, maximum duration, and standard deviation. The data is then stored in a database table, or other similar data structure.

The QO client then processes both the global statistics 316 and its local statistics 314 to generate estimates and recommendations, 318. These are sent up to the product instance 302 for display to the user through a user interface, 320. If there are no local statistics for a workflow/operation/task (i.e., it has not run locally before) then the global stats are used; otherwise, the local stats are used to reflect the individual system's historical performance. Thus, in an embodiment, the local and global statistics processing step 318 comprises reporting the estimate using historical local data unless there is not yet any historical data. On a case by case basis, the determinations or definitions for the estimate can use either the average, min, max, or range (min to max, +/−one standard deviation). A technician or user can analyze the global stats on the server, such as through direct query of a database, and decide whether a given workflow/operation/task has high variance, in which case the range or max might be specified in the estimate string definition, or generally consistent, in which case the average might be specified.

FIG. 4 illustrates a table 400 that lists the data elements for stored local statistics, under some embodiments. Table 400 is organized into the main section of name 402, result 404, and context 406. The name section 402 provides the name for the hierarchy of the overall workflow, an operation in the workflow and the quantum within the operation. The result section 404 shows the time statistics and success rate for the quantum, and the context section 404 lists the relative context parameters and their respective values in the appropriate format. The example context elements include System ID, Version, Configuration, Storage Size, and Assets Size. Any other appropriate features can also be used to define the context. The format and type of context data depends on the individual context field. For example, fields like System ID and Version are stored as alphanumeric strings, times are stored in seconds, size is stored in bytes, and other numerical values are stored in fixed units. In an embodiment, this table data is stored in a relational database such as SQLite, to enable flexible querying, filtering, and aggregation of data based on any column.

As shown in FIG. 1, the QO client 103 stores two separate tables in its internal database: one for local data and another for data downloaded from the QO server. This enables the comparison between the product instance's performance and the expected performance based on all systems. In an embodiment, the QO client can be embedded into the product instance as a C++/Java/Python library, Docker container, or separate binary. The product code then calls a QO client API to start (with provided context) and a quantum. A simplified C++ example is provided as follows:

```
Quantum q("SystemUpgrade.UpgradeDataStore.DownloadPackage",
Context c(ABC123, "1.1", "M2800"));
q.start( );
// ...
// download the package
// ...
q. end( );
```

In the above code sample, the context: c(ABC123, "1.1", "M2800") can be attached by a developer through an auto-query or similar process.

For the embodiment of FIG. 3, the QO client 304 queues updates and transmits each batch asynchronously to the QO server 306 as a background process, to minimize the impact on product performance. The QO client also logs the update locally to later re-calculate its local aggregate statistics, either when it downloads new global data from the QO server or at a regular periodicity (e.g., hourly).

With respect to the QO server 306, this server may be hosted in any number of ways, such as in an internal facility to collect testing data, as a service in a public cloud to collect data from multiple customers, or as a hosted application in a customer's datacenter to collect private data for that customer. The QO client 304 may connect to the server 306 directly, or via secure telemetry channels.

Figure 5:
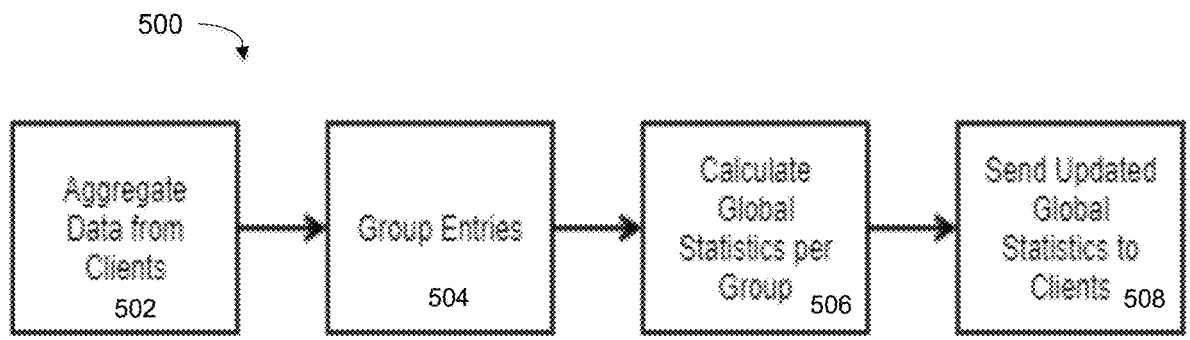
FIG. 5 illustrates certain high-level processes of a quantum operations server, under some embodiments.

FIG. 5 illustrates certain high-level processes of the QO server, under some embodiments. Diagram 500 illustrates the QO server high-level processes that are implemented as a pipeline for processing the QO client data. The first QO server process 502 is to aggregate the data from the clients. The QO server appends each quantum received from an instance of the QO client in a database, such as PostgreSQL. Next, it grouping the entries, 504. A pre-defined file specifies which fields from the context to use, and in which order, for grouping the entries for a given quantum. For example, a set of grouping rules can be as follows:
SystemUpgrade.DataStore.DownloadPackage: Version, Config; SystemUpgrade.DataStore.RunPrecheck: Version, Config, Size.Storage; [ . . . ]

For context fields that are strings, all entries with matching strings are grouped. For numerical context fields, entries are grouped into log (base 10) buckets, that is, entries with 0-9 in one group, 10-99 in the next group, 100-999 in the following, and so on. As stated, the grouping rules are determined by a pre-defined file, and there may be several different contexts that can be used to define different groupings. The grouping rules themselves have some flexibility to reference and compare different fields but are pre-defined by the implementor of the system.

After the context entries are grouped, the QO server calculates the global statistics per group, 506. In this step, for each group, the QO server calculates the overall success rate in percent, plus the following basic statistics for timing data: average, standard deviation, minimum, and maximum. One entry with the calculated values is added to the global database per group. In other embodiments, a process that uses more advanced statistical methods or Machine Learning may be substituted at this step to populate the global database with more accurate estimates.

In some cases, it may be necessary for certain numbers to be manually overridden, so a rule to fix the values for a particular quantum can also be specified. The QO server continues to collect and aggregate data, but the manually specified numbers are provided to instances of the product to show end users. For example, a software bug that occurs rarely may overly skew the aggregate statistics of the upgrade workflow in a particular version. In that case, values can be manually overridden in the QO server's database until the software bug is patched on the product side. In other embodiments, rules may be put into place to limit the maximum value of any particular quantum so that outliers do not improperly affect the overall statistics.

For process step 508, the QO server sends updated global statistics to the client. The client's local database shipped with the product uses the latest information from the server at build time for the default global values. Instances of the product in the field then update their internal global databases at a specified interval by downloading updates from the QO server, assuming it is not a dark site. For simplicity, the client receives all global statistics for the product, even if some groupings do not apply (e.g., due to size).

As shown for process 318 in FIG. 3, the QO client processes both its local statistics and the global statistics to process and generate a displayable alphanumeric text string ("UI string") with estimates and/or recommendations. The estimate could be presented as a simple message indicating an amount of time to complete the task or operation, such as: "the upgrade will take 30 minutes to complete." While the recommendation can be presented as a message like: "the upgrade has a 90% chance of successful installation." Such estimate/recommendation messages can be combined, such as "the upgrade has an 80% chance of completion within 20 minutes," or presented in any other similar manner. In general, the UI string from the estimate/recommendation comprises a text template, such as "the [task.name] will take [ave_time] to complete," where [task.name] and [ave_time] are text strings or derived numerical values that are input in the text template in step 318 for display in step 320.

In an embodiment, the local statistics take precedence over global statistics, and this rule is used if there is a conflict or significant difference between a client's local statistics and the global statistics returned by the server. For example, if the product instance is already more up to date or already has more positive performance (e.g., faster upgrades) then there is no need for recommendations. The comparison between local and global stats and the resulting recommendations are defined individually by the implementor of the system. The format of the definition file for an example rule could be as follows:

```
{
  "quantum": "SystemUpgrade",
  "resultCondition": "GLOBAL.Mean < (LOCAL.Mean - (2 * Local.StdDev))", "contextCondition": "GLOBAL.Version > LOCAL.Version && GLOBAL.Config == LOCAL.Config && RANGE(GLOBAL.Size.Storage, LOCAL.Size.Storage,10)",
  "recommendationString": "To improve upgrade performance, consider upgrading to version %GLOBAL.Version"
}
```

The QO client interprets this to know which workflow/operation/task to compare, what conditions need to be met between the local and global results/contexts for the recommendation to be made, and then what text string to pass to the UI for display. The rule definition file has some number of hard-coded rules, and the updates to the definition file itself can be downloaded by the QO client separately from the rest of the product. Alternatively, Machine Learning or some other mechanism can be used to automatically determine new rules.

Figure 6:
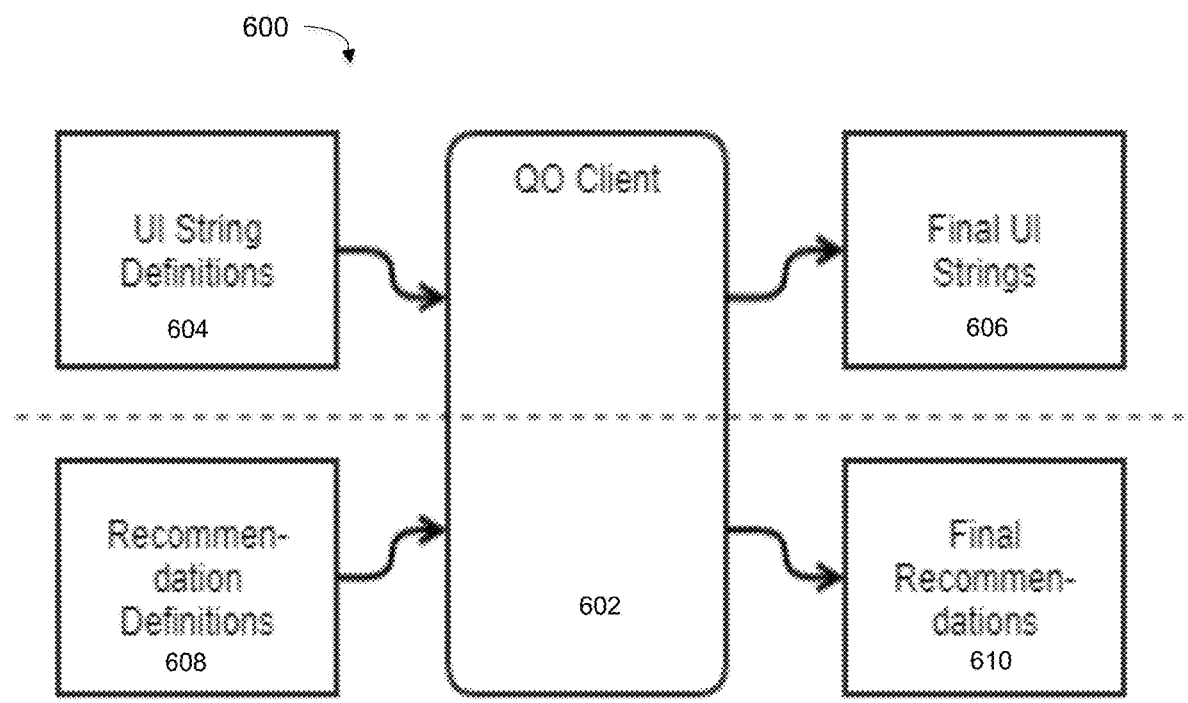
FIG. 6 illustrates the processing of definitions within the quantum operations client to produce time estimates and recommendations for display, under some embodiments.

The QO client includes front-end product integration to generate text strings for UI strings and basic recommendations. FIG. 6 illustrates the processing of definitions within the QO client to produce US strings and recommendations for display, under some embodiments. As shown in FIG. 6, for UI strings, the QO client 602 takes as an input a file containing UI string definitions 604, with parameters that will be replaced using information from the local database, to produce an output file with the final UI strings 606. The UI strings can be used in labels, alerts, or any other area of the UI.

Table 1 below is a table that illustrates certain parameters and functions used for the front-end component of the QO client, under some embodiments.

TABLE 1

| PARAMETERS | Quantum |
|---|---|
|  | Units |
| FUNCTIONS | MAX |
|  | RANGE |
|  | AVG |
|  | SUCCESS |
|  | ERROR |

As shown in FIG. 1, the parameters include <Quantum> and <Units>. The <Quantum> parameter is the specified Quantum; if an operation or workflow are specified, the result will be accumulated to the respective level. The <Units> parameter is the desired units for time-based functions: SECONDS, MINUTES, HOURS, DAYS. If not specified, minutes are used if <=90; otherwise, hours are used. The desired representation for rate-based functions: PERCENT (default), DECIMAL. In both cases, two significant digits are used.

The functions include: MAX, RANGE, AVG, SUCCESS, and ERROR. The MAX function: MAX(<Quantum>, <Units>) substitutes the string "up to N", where N is the maximum duration, along with the units (if specified). The RANGE function: RANGE(<Quantum>,<Units>) substitutes the string "between N and M", where N is the average duration minus one standard deviation and M is the average plus one standard deviation, along with the units (if specified). The AVG function: AVG(<Quantum>,<Units>) substitutes the string "about N", where N is the average duration, along with the units (if specified). The SUCCESS function: SUCCESS(<Quantum>,<Units>) substitutes the success rate, along with the units. The ERROR function: ERROR(<Quantum>,<Units>) substitutes the failure rate (100% minus success rate), along with the units.

As an example, consider following output template:
123,"The System Upgrade will take % s to complete, with a % s chance of success", MAX(SystemUpgrade,MINUTES),
SUCCESS(SystemUpgrade,PERCENT).

This code snippet will produce the following UI displayed message: "The System Upgrade will take up to 30 minutes to complete, with a 98% chance of success." If the UI needs to convert additional parameters internally, those parameters can be escaped (e.g., using '\') during this process. This process can be executed after each update from the QO server, before each new UI session, or any periodicity in between.

In an embodiment, the context associated with each quantum is also used to provide proactive recommendations to users to improve performance. Recommendations are generated using an expert system with pre-defined rules for the specific product. The rules are stored in a definition file that can be updated without changing the product code. For instance, there may be a rule that recommends a version upgrade if, for the "SystemUpgrade" workflow in the global data, the configuration is the same, the system size is within 10%, the version number is greater than the local one, and the average duration is more than two standard deviations lower than the local system's. A confidence interval may be provided to the customer to indicate the accuracy of the estimates. With reference to FIG. 6, for this embodiment, the QO client 602 takes as an input a file containing recommendation definitions 608, with parameters that will be replaced using information from the local database, to produce an output file with the final recommendations 610. The QO client reads the rules definition file, evaluates the rules, and outputs a set of strings with the resulting recommendations. Those strings can then be parsed and presented by the user interface as needed.

FIG. 7 is a flowchart that illustrates an overall method of providing estimates or recommendations for software lifecycle management tasks using a QO process, under some embodiments. Process 700 of FIG. 7 illustrates a method of providing estimated completion time and success probability, along with possible recommendations for future (next) runs of an application task based on a current local run and other client (global) runs of the application task. Process 700 illustrates certain processing steps executed by the QO client and begins by obtaining local timing and result data for a current run of an application task on the QO client, 702. The QO client stores the local timing and result data in a table of a client database, 706. It also sends the local timing and result data to QO server computer for aggregation with other local client timing and result data to form global timing and result data, and the QO server may perform grouping based on context as well, 706. The QO client receives back from the server, the global timing and result data, 708. It then combines the local timing and result data with the aggregated timing and result data to generate an estimated time completion and success probability for a next run of the application task, 710. The QO client uses a rule definition file to substitute function variables for UI strings and recommendation text with the appropriate values from the combined timing and result data, 712. It then outputs the final time estimate UI string and recommendation through a UI for display to the user, 714.

The workflow of FIG. 7 provides dynamic updates in that it is dynamic between runs, rather than being dynamic within a run (i.e., reflecting real-time changes). For example, if network speed is a field within the context, and the speed changes while a task is running, the new speed will not be recorded for the quantum for the task and therefore not impact the updated statistics. However, if the speed remains at its new value, then it will be recorded as part of the context in the quantum for the next run of the task, and will impact the next update of statistics and recommendations accordingly.

In an embodiment, the QO server database, being a general SQL or NoSQL database application, allows direct queries. This allows the enablement of certain use cases. For example, customer support can proactively identify customer systems with issues, e.g., slower maintenance after upgrade, and open service requests for further troubleshooting. Engineering can graph the performance across versions to validate the success of optimizations or identify possible regressions. Product management can monitor the usage of a feature in the field to help prioritize enhancements. These use cases illustrate some of the side benefits of the existing data generated by the QO Server.

System Implementation

Embodiments of the processes and techniques described above can be implemented on any appropriate networked computer system. Such embodiments may include other or alternative data structures or definitions as needed or appropriate. The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 8:
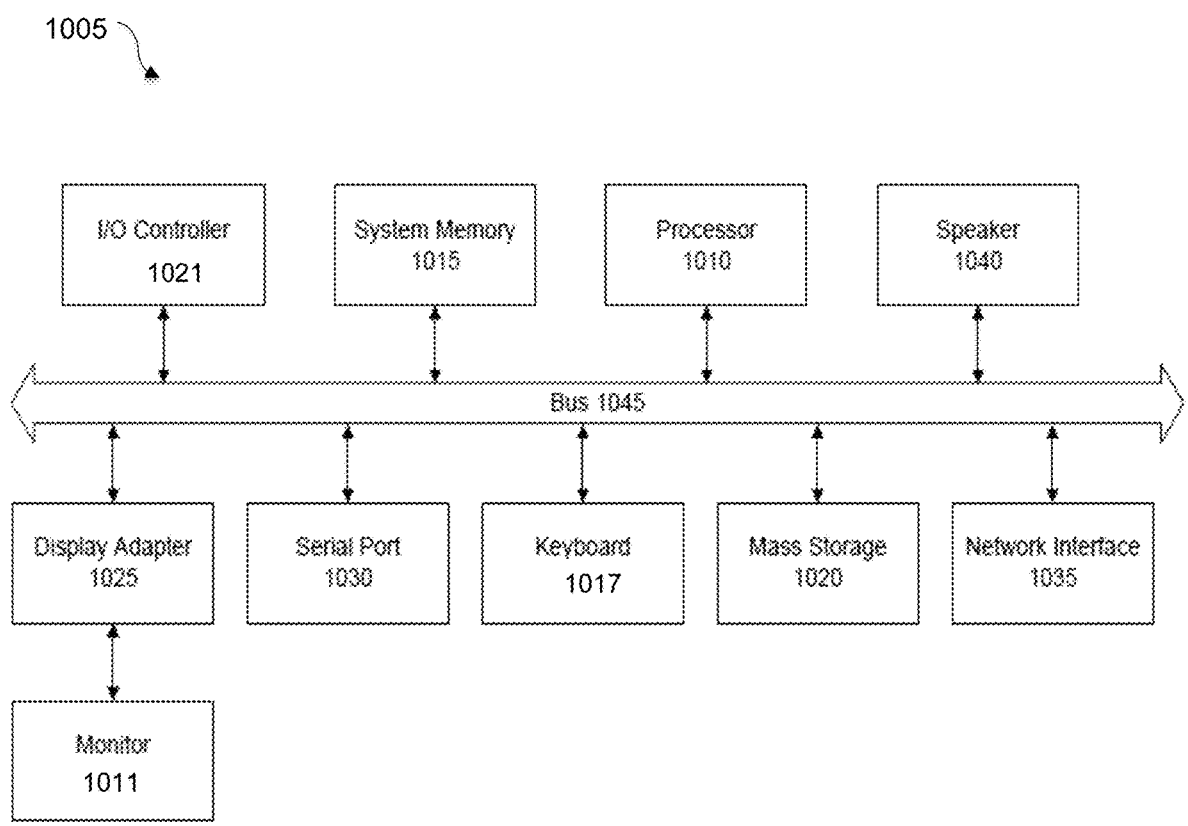
FIG. 8 is a system block diagram of a computer system used to execute one or more software components of the quantum operations process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 8 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 8 is but an example of a computer system suitable for use with the present system.

Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing estimated completion time and success probability of applications on a client computer, comprising:

providing an operations server in a data backup system processing large numbers of data assets, and that maintains a database storing aggregate and global timing and result data for the backup system;

embedding an operation component in an instance of an application in the client computer, and communicably coupled to the operations server;

obtaining, by the operation component, local timing and result data for a current run of the application on the client computer, the local timing data comprising elapsed time durations between machine-generated start and end timestamps for the current run;

storing the local timing and result data in a first table of a client database;

associating, with the local timing and result data, a context comprising operational or configuration properties that have at least some effect the elapsed time durations;

sending the local timing and result data to the operations server computer for aggregation with other local client timing and result data to form global timing and result data;

receiving, by the client computer, the global timing and result data from the server computer; and combining the local timing and result data with the aggregated timing and result data to generate an estimated time completion and success probability for a next run of the application task.

2. The method of claim 1 further comprising displaying the estimated time completion and success probability for display to a user through a user interface of the client computer, and wherein the estimated time completion is calculated from timing data comprising an average duration, minimum duration, maximum duration, and standard deviation of duration for the task.

3. The method of claim 2 further comprising making one or more recommendations to improve the timing and result data based on certain aggregated data.

4. The method of claim 1 further comprising determining if there is a conflict between the local timing and result data and the other local client and result data and, if so, using the local timing and result data to form the global timing and result data.

5. The method of claim 1 wherein the context is defined by a plurality of data element fields including: application version number, system configuration, data size, and storage size.

6. The method of claim 1 further comprising: grouping application tasks for the client computer and other client computers into grouped tasks based on a respective context of each application task.

7. The method of claim 1 wherein the local timing data includes the elapsed time duration and an average time calculated from the elapsed time.

8. The method of claim 1 wherein a quantum is named using a text string having a format: (Workflow Name).(Operation Name).(Quantum Name), and wherein a subset of the text string specifies the aggregate data for all entries at respective level of workflow, operation, and quantum.

9. The method of claim 1 wherein the application task is part of a lifecycle management process for a software product, and comprises a program having a finite completion time and an uncertain chance of success, and that can block full use of the client computer by a user during its execution.

10. A method of providing estimated time duration and success probability for future application program runs on a client computer, comprising:
providing an operations server computer in a data backup system processing large numbers of data assets, and that maintains a database storing aggregate and global timing and result data for the backup system;
embedding an operation component in an instance of an application in the client computer, and communicably coupled to the operations server;
obtaining and storing, by the operation component, local timing and result data for a current run of an application task on a local client, the local timing data comprising elapsed time durations between machine-generated start and end timestamps for the current run;
gathering global timing and result data in the operations server computer for a plurality of clients including the local client;
combining, in the local client, the local timing and result data with the global timing and result data from the operations server computer to calculate an estimated time completion and success probability for a next run of the application task;
associating, with the local timing and result data, a context comprising operational or configuration properties that have at least some effect the elapsed time durations; and
generating a text message for display through a user interface displaying the result data for estimated time completion and success probability.

11. The method of claim 10 further comprising displaying usage recommendations for the next run through an additional text message displayed through the user interface.

12. The method of claim 11 further comprising using, in the client computer, a rule definition file to substitute function variables for text strings with the appropriate values from the combined timing and result data to output a final time estimate text string, a final success probability value, and recommendation text string through the user interface for display to a user.

13. The method of claim 10 wherein the application program is part of a lifecycle management process for a software product, and comprises a program having a finite completion time and an uncertain chance of success, and that can block full use of the client computer by a user during its execution, and wherein the task is smallest granularity element of a program hierarchy comprising a plurality of tasks within an operation and a plurality of operations within a workflow.

14. The method of claim 13 further comprising creating a quantum from the task by associating timing duration data associated with completion of the task and a success or failure result of the task.

15. The method of claim 14 further comprising associating the context with the quantum.

16. A system providing estimated completion time and success probability of applications, comprising:
an operations server in a data backup system processing large numbers of data assets and maintaining a database storying aggregate and global timing and result data for the backup system;
a client computer obtaining local timing and result data for a current run of an application task executed on the client computer, the local timing data comprising elapsed time durations between machine-generated start and end timestamps for the current run;
an operation component embedded in an instance of an application in the client computer, and communicably coupled to the operations server;
a client database storing the local timing and result data in a first table, and further associating, with the local timing and result data, a context comprising operational or configuration properties that have at least some effect the elapsed time durations;
an interface sending the local timing and result data to the operations server computer for aggregation with other local client timing and result data to form global timing and result data, the interface receiving back the global timing and result data from the server computer;
a processing component of the client computer combining the local timing and result data with the aggregated timing and result data to generate an estimated time completion and success probability for a next run of the application task; and
a user interface displaying the estimated time completion and success probability as a text message to a user.

17. The system of claim 16 wherein server computer is coupled to a plurality of other client computers in addition to the client computer, and wherein each client computer has a respective embedded client process gathering and storing respective local timing and result data for the application task for generation of the global timing and result data.

18. The system of claim 17 wherein the client computer creates a quantum from the task by associating timing duration data associated with completion of the task and a success or failure result of the task, and further associates the context with the quantum.

19. The system of claim 18 wherein the processing component of the client computer further displays usage recommendations for the next run through an additional text message displayed through the user interface.

20. The system of claim 18 wherein the processing component of the client computer comprises a rule definition file to substitute function variables for text strings with the appropriate values from the combined timing and result data to output a final time estimate text string, a final success probability value, and recommendation text string through the user interface for display to the user.

* * * * *